United States Patent Office 3,816,410
Patented June 11, 1974

3,816,410
PREPARATION OF LACTAMS
Roger G. Duranleau, Ardonia, and Richard F. Love, Fishkill, N.Y., assignors to Texaco (Inc.), New York, N.Y.
No Drawing. Filed Dec. 8, 1971, Ser. No. 206,199
Int. Cl. C07d 41/06
U.S. Cl. 260—239.3 A
19 Claims

ABSTRACT OF THE DISCLOSURE

A method for preparing lactams by the steps of (1) cleaving and esterifying a cyclic alpha-nitroketone with an alcohol to form an alkyl omega-nitroester and (2) catalytically hydrogenating and cyclizing the nitroester to a lactam.

BACKGROUND OF THE INVENTION

This invention relates to a novel method for preparing lactams from cyclic nitroketones. In particular, this invention relates to a method for preparing lactams in the absence of the formation of large quantities of by-products.

The conversion of cyclic alpha-nitroketones to lactams, for example the conversion of 2-nitrocyclohexanone to caprolactam, can be undertaken in a single stage by contacting the cyclic nitroketone with hydrogen, an alcohol and an active hydrogenation catalyst. In such a single step process a serious disadvantage occurs in that the caprolactam product contains substantial amounts of decahydrophenazine. To the extent that competing reactions occur in such a process forming such a dihydropyrazine, a corresponding amount of nitroketone cannot be converted to caprolactam. As such a process capable of providing lactams which simultaneously does not produce substantial amounts of by-products would be highly desirable.

It is therefore an object of this invention to provide a method for the preparation of lactams.

Another object of this invention is to provide a method for the preparation of lactams from cyclic nitroketones.

Yet another object of this invention is to provide a method for the preparation of lactams in high yields and in the absence of forming substantial amounts of by-products.

A further object of this invention is to provide a method for the preparation of caprolactam from 2-nitrocyclohexanone.

Other objects and advantages will become apparent from a reading from the following detailed description and examples.

SUMMARY OF THE INVENTION

Broadly, this invention contemplates a method for preparing lactams which comprises the steps of:
(a) Contacting an alpha-nitrocycloalkanone corresponding to the formula:

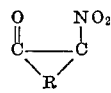

where R is a polymethylene radical of from 3 to 4 carbons or a substituted polymethylene radical of from 4 to 22 carbons containing one or more substituents selected from the group consisting of alkyl, alkenyl and aryl with an alcohol in a non-aqueous environment at a temperature of from about 20 to 200° C. thereby forming an alkyl omega-nitroalkanoate, and
(b) Contacting said alkyl omega-nitroalkanoate with hydrogen and a Group VIII metal catalyst at a temperature of from 20 to 300° C. and under a pressure of 500 to 1500 p.s.i.g.

STEP ONE

According to our invention the first step of the instant method involves contacting an alpha-nitrocycloalkanone corresponding to the above formula with an alcohol wherein the cyclic nitroketone is cleaved and esterified at temperatures of from 20 to 200° C. to the corresponding alkyl omega-nitro-alkanoate. In practice mole ratios of cyclic nitroketone to alcohol of from 1:1 to 1:100, preferably 1:5 to 1:25, are employed.

Illustrative of the cyclic nitroketones contemplated herein as reactants in the first step we mention 2-nitrocyclopentanone,
2-nitro-3-methylcyclopentanone,
2-nitro-4-methylcyclopentanone,
2-nitro-5-methylcyclopentanone,
2-nitro-3,4,5-trimethylcyclopentanone,
2-nitro-5-ethylcyclopentanone,
2-nitro-4-hexylcyclopentanone,
2-nitro-3-decyclopentanone,
2-nitro-5-dodecyclopentanone,
2-nitro-4-ethenylcyclopentanone,
2-nitro-cyclohexanone,
2-nitro-3-methylcyclohexanone,
2-nitro-4-methylcyclohexanone,
2-nitro-5-methylcyclohexanone,
2-nitro-6-methylcyclohexanone,
2-nitro-6-benzylcyclohexanone,
2-nitro-5-phenylcyclohexanone,
2-nitro-3-(1-naphthyl)cyclohexanone,
2-nitro-4-octadecylcylohexanone,
2-nitro-1-tetralone,
2-nitro-1-indanone and
1-nitro-2-indanone.

Alcohols employed in this first step of the method correspond to the formula R'OH and include primary and secondary alcohols. Tertiary alcohols have not been found to be reactive. Thus, in the formula above, R' can be an alkyl group of from 1 to 20 carbon atoms such as methyl, ethyl, propyl, butyl, hexyl, octyl, decyl, dodecyl or hexadecyl. Dihydroxy and polyhydroxy primary and secondary alcohols are also intended to be understood as operative in the instant method. Illustrative of the alcohols contemplated herein we mention methanol, ethanol, isopropanol, n-butanol, 2-hexanol, cyclohexanol, 2-octanol, 2-decanol, 1-dodecanol, 1-hexadecanol, ethylene glycol, propylene glycol, and pentaerythritol. Mixtures of alcohols such as $C_{10}$ to $C_{13}$ alcohols are contemplated including isomeric mixtures containing primary and secondary alcohols.

In one embodiment, cleavage and esterification can be undertaken thermally, that is in the absence of a catalytic agent employing temperatures of from about 50 to 200° C., preferably from 100 to 190° C. In another embodiment, cleavage and esterification can be accomplished catalytically employing a basic catalyst at temperatures of from 20 to 120° C., preferably 60 to 100° C. In practice, catalytic reactions below 20° C. are excessively slow. Conversely, thermal reactions exceeding 200° C. are deleterious in that thermal decomposition of the cyclic nitroketone to a mixture of products occurs rather than the desired cleavage and esterification. Pressures of from 0 to 500 p.s.i.g. may be employed. Specifically thermal conversions are preferably conducted at pressures of 0 to 500 p.s.i.g. and the catalytic conversions conducted at pressures of from 0 to 40 p.s.i.g.

Most importantly this first step in the method must be conducted in a non-aqueous environment, that is, in the substantial absence of water. The cleavage and esterification reaction whether conducted thermally or catalytically is sensitive to water and water in amounts exceeding 0.1 weight percent based on the weight of alcohol employed cause competing reactions to occur leading to the formation of acids instead of the desired ester. In a highly preferred aspect of this invention absolute alcohols are used. Excessive amounts of alcohol can be employed serving as solvent for the reaction or alternatively an inert reaction solvent may be utilized such as n-hexane, n-heptane, xylene, ethylbenzene, dichlorobenzene, methylnaphthlene, dioxane and tertiary alcohols. The reaction time for this first step ranges from a few minutes to two hours.

With regard to the first step embodiment involving catalytic cleavage and esterification, the basic catalysts contemplated herein are oxides, hydroxides and salts of the metals of Groups I–A and II–A of the Periodic Table exemplified by sodium hydroxide, sodium carbonate, sodium fluoride, sodium acetate, sodium decanoate, potassium hydroxide, potassium carbonate, potassium fluoride, potassium acetate, potassium octanoate, calcium oxide, calcium carbonate, calcium fluoride, calcium propionate, barium oxide, barium carbonate, barium fluoride and barium hexanoate. Other basic catalysts include tertiary amines such as trimethylamine and triethylamine. Highly preferred catalysts are sodium carbonate, potassium carbonate and potassium fluoride. In accordance with this embodiment the alpha-nitrocycloalkanone and alcohol are contacted with the catalyst in a weight ratio of catalyst to nitroketone between about 0.01:1 and 0.2:1 thereby forming an alkyl omega-nitroalkanoate corresponding to the formula:

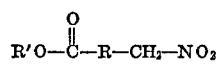

where R and R' are as heretofore defined. At the completion of this step catalyst, if employed, is separated as for example by filtration. Specific examples of alkyl omega-nitroalkanoates prepared by the first step of this method include by way of illustration methyl 5-nitropentanoate,
methyl 4-methyl-5-nitropentanoate,
ethyl 3-methyl-5-nitropentanoate,
1-butyl 2-methyl-5-nitropentanoate,
hexyl 2,3,4-trimethyl-5-nitropentanoate,
ethyl 2-ethyl-5-nitropentanoate,
isopropyl 3-hexyl-5-nitrohexanoate,
cyclohexyl 3-decyl-5-nitropentanoate,
2-hydroxyethyl 2-dodecyl-5-nitropentanoate,
1,3-dihydroxy-2-propyl 3-ethenyl-5-nitropentanoate,
methyl 6-nitrohexanoate,
ethyl 5-methyl-6-nitrohexanoate,
isopropyl 4-methyl-6-nitrohexanoate,
hexyl 3-methyl-6-nitrohexanoate,
hexadecyl 2-methyl-6-nitrohexanoate,
cetyl 2-benzyl-6-nitrohexanoate,
ethyl 3-phenyl-6-nitrohexanoate,
ethyl 3-(1-naphthyl)-6-nitrohexanoate,
1-methylnonyl 4-octadecyl-6-nitrohexanoate,
methyl 2-(3-nitropropyl) benzoate,
ethyl 2-(2-nitroethyl) benzoate,
butyl 2-nitromethylphenylacetate and
cetyl 6-nitrohexanoate.

At the completion of the first step involving cleavage and esterification, the product comprises an omega-nitroester substantially free of by-products. To recover the nitroester the reaction mixture composed of excess alcohol, nitroester and, if present, solvent is distilled at atmospheric pressure to remove the alcohol and solvent. The residue is the nitroester which can be further purified by vacuum distillation if desired.

STEP TWO

In the second step of the method the alkyl omega-nitroalkanoate formed above is hydrogenated and cyclized to the lactam by contacting with hydrogen and a highly active Group VIII metal catalyst for a period of one-half to 5 hours at a temperature of from about 20 to 300° C., preferably 100 to 200° C. under hydrogen pressures of from 500 to 1500 p.s.i.g. Illustrative of the Group VIII metal catalysts we mention the oxides, hydroxides and salts of the metals platinum, palladium, rhodium, ruthenium, iron, cobalt, nickel, iridium and osmium and mixtures thereof as for example platinum oxide, palladium chloride, Raney nickel, nickel on kieselguhr, platinum on carbon, rhodium on carbon, iron oxide, and cobalt on silica. The metals themselves may also be employed including platinum, palladium, rhodium, ruthenium, and nickel.

The preferred and convenient solvents for the hydrogenation are the alcohols used in step one. This permits the reduction to occur in the solution from step one without necessitating the separation of alcohol and, if employed, solvent thereby improving the efficiency of the process. Other solvents can be used in this step and among those contemplated are pentane, heptane, decalin, tetrahydrofuran, triethylamine and dimethylaniline. At the completion of the second step the product obtained comprises from 50 to 70 percent lactam and the remainder being essentially an alkyl omega-aminoalkanoate corresponding to the formula:

where R and R' are as heretofore defined. The lactam can be recovered from the product by distillation, preferably under reduced pressures. Upon distillation of the lactam from the reaction mixture additional aminoester will cyclize to the lactam. The distillation also yields as a co-product the alcohol R'OH. The alcohol, used either as a reactant or solvent and reactant, can be recycled to step one.

The lactams prepared by the second step of the method correspond to the formula:

where R is as heretofore defined. Illustrative of the lactams we mention 5-pentanelactam,
4-methyl-5-pentanelactam,
3-methyl-5-pentanelactam,
2-methyl-5-pentanelactam,
2,3,4-trimethyl-5-pentanelactam,
2-ethyl-5-pentanelactam,
3-hexyl-5-pentanelactam,
3-decyl-5-pentanelactam,
2-dodecyl-5-pentanelactam,
3-ethenyl-5-pentanelactam,
6-hexanelactam,
5-methyl-6-hexanelactam,
4-methyl-6-hexanelactam,
3-methyl-6-hexanelactam,
2-methyl-6-hexanelactam,
2-benzyl-6-hexanelactam,
3-phenyl-6-hexanelactam,
5-(1-naphthyl)-6-hexanelactam,
4-octadecyl-6-hexanelactam, 2,3-benzo-6-hexanelactam,
2,3-benzo-5-pentanelactam and
3,4-benzo-5-pentanelactam.

Such lactams are useful in the production of polyamides, fibers and resins.

A particular advantage of the two step method employed herein resides in the ability to essentially convert all of the alpha-nitrocycloketone to a lactam and an alkyl omega-aminoalkanoate. In the instance where steps one and two are combined such that the nitrocycloketone, such as 2-nitrocyclohexanone, is simultaneously contacted with an alcohol, hydrogen and the aforementioned highly active Group VIII metal catalysts such as platinum oxide, Raney nickel or palladium metal, the reaction product contains substantial amounts of decahydrophenazine to the order of 40 percent. To the extent that competing reactions occur when one combined stage is employed resulting in the formation of such a dihydropyrazine, a corresponding amount of cyclic nitroketone can not be converted to the lactam. Here, by employing individual steps the formation of measurable amounts of the dihydropyrazine is avoided inasmuch as hydrogen introduction is withheld until stage one is completed, namely until the alkyl omega-nitroalkanoate is formed. Dihydropyrazine formation is avoided since condensation can not proceed from the open chain nitroester.

In order to more fully illustrate the nature of this invention and the manner of practicing the same the following examples are presented.

EXAMPLE I

To 4.6 grams (0.032 mole) of 2-nitrocyclohexanone there was added 200 milliliters (5 moles) of absolute methanol in a pressure reactor. 0.2 gram of platinum oxide catalyst was added at this point for convenience and does not take part in this step of the method. The solution was heated to a temperature of 135 to 149° C. for 2 hours thereby forming methyl 6-nitrohexanoate.

Thereafter, the reactor was pressurized to 1000 p.s.i.g. with hydrogen whereupon a 5 to 10° C. exotherm was observed and the reaction was maintained at 149° C. for two hours and thereafter at a temperature 190 to 204° C. for an additional 3 hours. The reaction mixture was filtered to remove the catalyst, methanol stripped therefrom by distillation and a residue weighing 3.87 grams was obtained and identified by infrared and nuclear magnetic resonance analyses to be caprolactam and methyl 6-aminohexanoate in the ratio of 7 to 3.

The residue was further heated to a temperature of 112 to 121° C. under 2 mm. pressure and caprolactam was distilled from the mixture. The aminoester, methyl 6-aminohexanoate, largely cyclizes to caprolactam and an 80 percent yield of caprolactam basis the 2 nitrocyclohexanone charged was recovered.

EXAMPLE II

To a solution containing 10 grams (0.07 mole) of 2-nitrocyclohexanone and 200 milliliters (4.96 moles) of anhydrous methanol in a pressure reactor, there was added 0.2 gram of a platinum oxide catalyst. The reaction vessel was sealed, flushed with nitrogen and pressurized to 1000 p.s.i.g. with hydrogen at 21° C. Upon initial stirring an exotherm occurred and the temperature of the reaction mixture increased to 27° C. and the pressure decreased to 975 p.s.i.g. The mixture was then slowly heated with continued stirring and after 30 minutes the temperature rose to 57° C. and at the completion of 1 hour to 102° C. Further heating for an additional 30 minutes brought the reaction temperature to about 149° C. and a pressure of 1260 p.s.i.g. at which point the reaction was maintained at 149° C. for an additional 3 hours. Hydrogen absorption continued for 2 of the 3 hours and a total of approximately 150 pounds of hydrogen was absorbed at 149° C. The reaction mixture was then cooled, hydrogen removed and the vessel flushed with nitrogen. After removal from the reactor, the product was filtered to remove the catalyst, and the product stripped of methanol by distillation under a reduced pressure of 30 mm./Hg. The residue, 7.2 grams, basis infrared and nuclear magnetic resonance spectral analyses was found to be a mixture of caprolactam (25 percent), methyl 2-aminohexanoate (33 percent) and 42 percent decahydrophenazine.

We claim:
1. A method for preparing lactams which comprises the steps of:
   (a) contacting an alpha-nitrocycloalkanone corresponding to the formula:

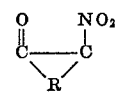

where R is a polymethylene radical of from 3 to 4 carbons or a substituted polymethylene radical of from 4 to 22 carbons containing one or more substituents selected from the group consisting of alkyl, alkenyl and aryl with an alcohol wherein said alcohol is a primary or secondary alcohol corresponding to the formula R'OH where R' is an alkyl group of from 1 to 20 carbon atoms, in a non-aqueous environment at a temperature of from about 20 to 200° C. thereby forming an alkyl omega-nitroalkanoate, and
   (b) contacting said alkyl omega-nitroalkanoate with hydrogen and a Group VIII metal catalyst at a temperature of from about 20 to 300° C. and under a hydrogen pressure of 500 to 1500 p.s.i.g.

2. A method according to claim 1 wherein said alcohol in (a) is methanol.

3. A method according to claim 1 wherein said alcohol in (a) is isopropanol.

4. A method according to claim 1 wherein step (a) is conducted thermally at a temperature of from 50 to 200° C.

5. A method according to claim 1 wherein step (a) is conducted thermally at a temperature of from 100 to 190° C.

6. A method according to claim 1 wherein step (a) is conducted in the pressure of a basis catalyst at a temperature of from 20 to 120° C.

7. A method according to claim 1 wherein step (a) is conducted in the presence of a basic catalyst at a temperature of from 60 to 100° C.

8. A method according to claim 6 wherein said catalyst is potassium fluoride.

9. A method according to claim 6 wherein said catalyst is potassium carbonate.

10. A method according to claim 6 wherein said catalyst is sodium carbonate.

11. A method according to claim 6 wherein said weight ratio of catalyst to nitroketone ranges from about 0.01:1 to 0.2:1.

12. A method according to claim 1 wherein the mole ratio of alpha-nitrocycloalkanone to alcohol in step (a) ranges from 1:1 to about 1:100.

13. A method according to claim 1 wherein said alkyl-omega-nitroalkanoate in (a) is methyl 6-nitrohexanoate.

14. A method according to claim 1 wherein said Group VIII metal catalyst is platinum oxide.

15. A method according to claim 1 wherein said Group VIII metal catalyst is nickel on kieselguhr.

16. A method according to claim 1 wherein said contacting in (b) is conducted at a temperature of from 100 to 220° C.

17. A method according to claim 1 wherein said lactam is 5-pentanelactam.

18. A method according to claim 1 wherein said lactam is 6-hexanelactam.

19. A method according to claim 1 wherein said alpha-nitrocycloalkanone is 2-nitrocyclohexanone.

References Cited

UNITED STATES PATENTS

| | | | |
|---|---|---|---|
| 2,071,253 | 2/1937 | Carothers | 260—239.3 A |
| 3,560,484 | 2/1971 | Tanaka et al. | 260—239.3 A |
| 3,574,756 | 4/1971 | Sheehan et al. | 260—239.3 R |
| 3,637,839 | 1/1972 | Tanaka et al. | 260—586 R |
| 3,658,810 | 4/1972 | Tanaka et al. | 260—239.3 A |

HENRY R. JILES, Primary Examiner

R. T. BOND, Assistant Examiner

U.S. Cl. X.R.

260—239.3 R, 293.86, 482 R, 478, 586 R